United States Patent
Pan et al.

(10) Patent No.: US 8,072,899 B2
(45) Date of Patent: Dec. 6, 2011

(54) METHOD AND APPARATUS FOR MEASURING AND REPORTING A RANK AND A PRECODING MATRIX FOR MULTIPLE-INPUT MULTIPLE-OUTPUT COMMUNICATION

(75) Inventors: Kyle Jung-Lin Pan, Smithtown, NY (US); Donald M. Grieco, Manhasset, NY (US); Robert L. Olesen, Huntington, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 131 days.

(21) Appl. No.: 12/496,129

(22) Filed: Jul. 1, 2009

(65) Prior Publication Data

US 2010/0002598 A1 Jan. 7, 2010

Related U.S. Application Data

(60) Provisional application No. 61/077,620, filed on Jul. 2, 2008, provisional application No. 61/077,709, filed on Jul. 2, 2008.

(51) Int. Cl.
*H04L 12/26* (2006.01)
*H04L 17/28* (2006.01)
*H04B 7/00* (2006.01)

(52) U.S. Cl. .................. 370/252; 370/310; 375/260

(58) Field of Classification Search .......... 370/252, 370/310, 328–329, 342–345, 203, 208, 210, 370/334–335; 375/267, 260
See application file for complete search history.

(56) References Cited

U.S. PATENT DOCUMENTS

| 7,764,931 | B2 * | 7/2010 | Kim et al. ................... 455/69 |
| 2007/0098106 | A1 * | 5/2007 | Khojastepour et al. ....... 375/267 |
| 2008/0056414 | A1 * | 3/2008 | Kim et al. ................... 375/347 |
| 2008/0112500 | A1 * | 5/2008 | Pan et al. ................... 375/267 |
| 2008/0170523 | A1 * | 7/2008 | Han et al. ................... 370/310 |
| 2008/0188190 | A1 * | 8/2008 | Prasad et al. ............... 455/114.3 |
| 2008/0232492 | A1 * | 9/2008 | Xiao et al. ................... 375/260 |

(Continued)

FOREIGN PATENT DOCUMENTS

WO 06/138337 12/2006

OTHER PUBLICATIONS

Interdigital Communications Corporation, "Binary Differential Feedback Scheme for Downlink MIMO Pre-coding for E-UTRA," 3GPP TSG RAN WG1 Meeting #48, R1-071135, (Feb. 12-16, 2007).

Kovacs et al., :Performance of MIMO Aware RRM in Downlink OFDMA IEEE Vehicular Technology Conference, pp. 1171-1173 (May 2008).

(Continued)

*Primary Examiner* — Candal Elpenord
(74) *Attorney, Agent, or Firm* — Volpe and Koenig, P.C.

(57) ABSTRACT

A method and apparatus for measuring and reporting a rank and/or a precoding matrix for multiple-input multiple-output (MIMO) communication are disclosed. A metric indicating a channel condition is measured and a rank is selected based on the metric. The metric may be a signal-to-interference and noise ratio (SINR), throughput, a block error rate (BLER), system capacity, a sum rate, or the like. An SINR for each radio block group (RBG) for each rank is calculated. A data rate is calculated for each RBG based on the SINR for each rank. An overall rate for all RBGs is calculated for each rank. At least one rank is selected based on the overall rate. At least one precoding matrix may be selected jointly with or separately from the at least one rank.

9 Claims, 3 Drawing Sheets

U.S. PATENT DOCUMENTS

2008/0305745 A1* 12/2008 Zhang et al. ............... 455/67.11
2009/0003474 A1* 1/2009 Pan et al. ...................... 375/260
2009/0017769 A1* 1/2009 Chen et al. ..................... 455/69
2009/0207784 A1* 8/2009 Lee et al. ...................... 370/328
2011/0013563 A1* 1/2011 Sivanesan et al. ............ 370/328

OTHER PUBLICATIONS

Lee et al., "Novel Multi-User MIMO Scheme Based on Successive Interference Cancellation," IEEE International Symposium on Consumer Electronics, pp. 1-5, (Jun. 2007).

* cited by examiner

METHOD AND APPARATUS FOR MEASURING AND REPORTING A RANK AND A PRECODING MATRIX FOR MULTIPLE-INPUT MULTIPLE-OUTPUT COMMUNICATION

CROSS REFERENCE TO RELATED APPLICATIONS

This application claims the benefit of U.S. Provisional Application No. 61/077,620 filed Jul. 2, 2008 and 61/077,709 filed Jul. 2, 2008, which are incorporated by reference as if fully set forth.

FIELD OF INVENTION

This application is related to wireless communications.

BACKGROUND

Spatial multiplexing of a wireless transmit/receive unit (WTRU) that uses multiple-input multiple-output (MIMO) communication means may involve determining a number of settings and parameters. The selection of these settings and parameters desirably improve the quality and reliability of the MIMO communications. For example it is desirable for the WTRU to determine a desired rank indicating a number of useful transmission layers.

For open-loop spatial multiplexing mode, a reported rank equal to one indicates a transmit diversity should be used for the MIMO communications, while a reported rank higher than one, (e.g., two, three, or four), indicates that large delay cyclic delay diversity (CDD) with two, three or four corresponding layers should be used.

For closed-loop spatial multiplexing mode, a reported rank indicates a closed-loop precoding with the corresponding number of layers, (e.g., one, two, three or four), should be used.

Rank measurement and generation may be performed for MIMO spatial multiplexing for both open-loop and close-loop schemes.

Additionally, the determination of a precoding matrix index (PMI) may be desirable for MIMO communications by a WTRU.

The present application includes several example methods and apparatuses for selecting and reporting ranks and PMIs for MIMO communication by a WTRU.

SUMMARY

A method and apparatus for measuring and reporting a rank and/or a precoding matrix for multiple-input multiple-output (MIMO) communication are disclosed. A metric indicating a channel condition is measured and a rank is selected based on the metric. The metric may be a signal-to-interference and noise ratio (SINR), throughput, a block error rate (BLER), system capacity, a sum rate, or the like. An SINR for each radio block group (RBG) for each rank is calculated. A data rate is calculated for each RBG based on the SINR for each rank. An overall rate for all RBGs is calculated for each rank. At least one rank is selected based on the overall rate. At least one precoding matrix may be selected jointly with or separately from the at least one rank.

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
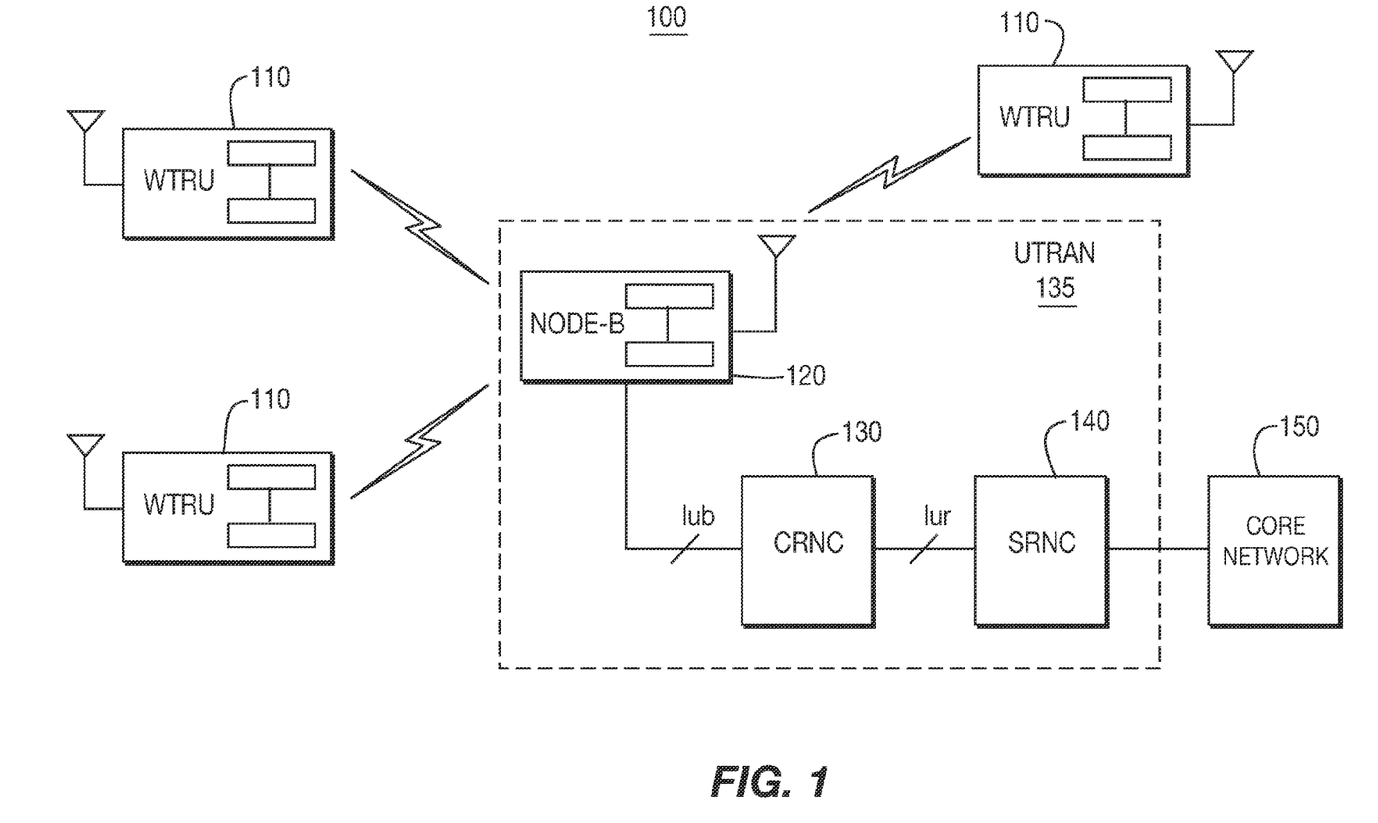
FIG. 1 is a schematic block diagram illustrating an example long term evolution advanced (LTE-A) telecommunications system according to the present application.

FIG. 1 shows a wireless communication system 100 including a plurality of WTRUs 110, a Node-B 120, a controlling radio network controller (CRNC) 130, a serving radio network controller (SRNC) 140, and a core network 150. The Node-B 120 and the CRNC 130 may collectively be referred to as the UTRAN.

As shown in FIG. 1, the WTRUs 110 are configured for multiple-input multiple-output (MIMO) communication with the Node-B 120, which is in communication with the CRNC 130 and the SRNC 140. Although three WTRUs 110, one Node-B 120, one CRNC 130, and one SRNC 140 are shown in FIG. 1, it should be noted that any combination of wireless and wired devices may be included in the wireless communication system 100.

Figure 2:
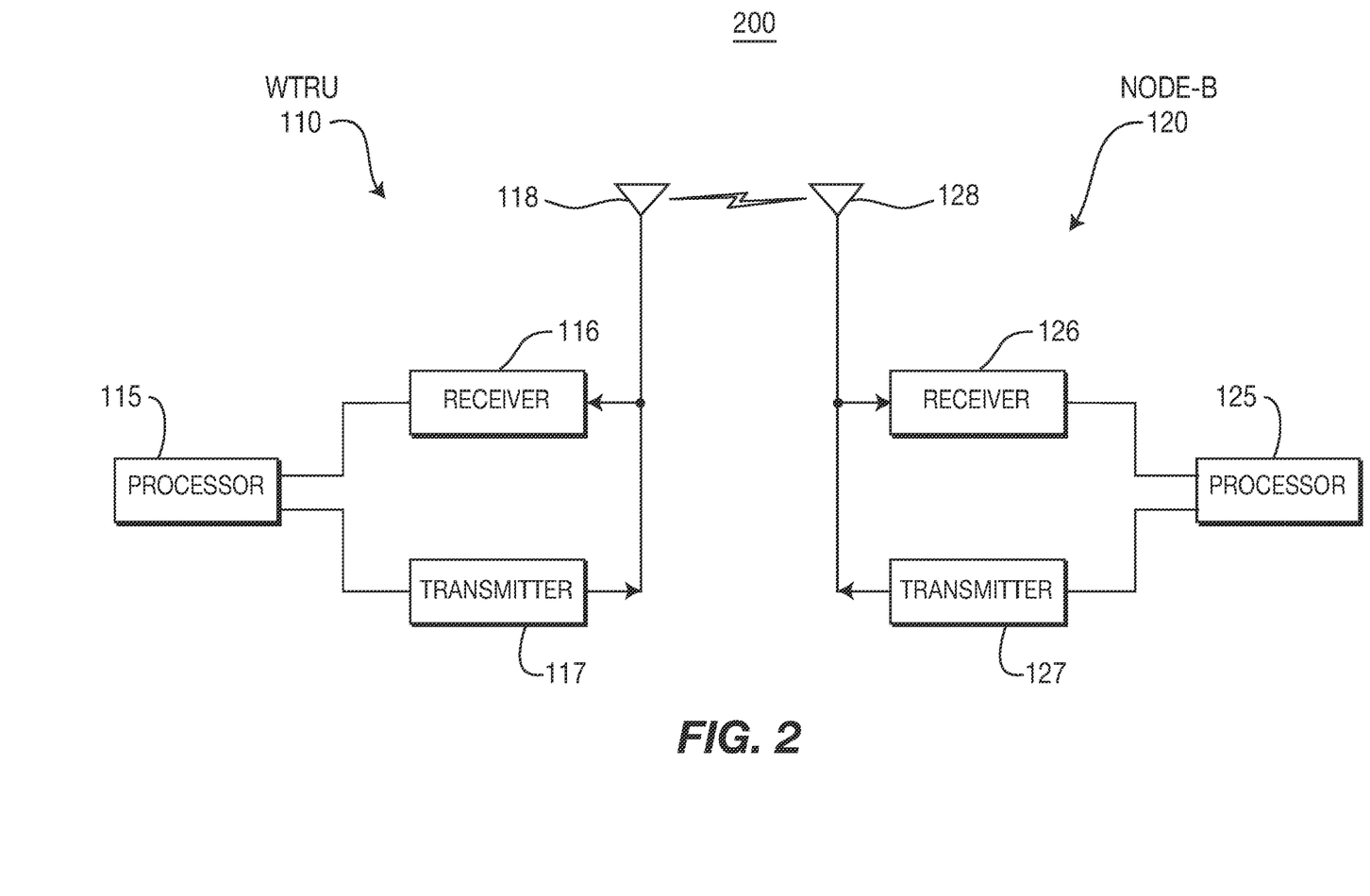
FIG. 2 is a schematic block diagram illustrating an example wireless transmit/receive unit (WTRU) and Node-B according to the present application.

FIG. 2 is a functional block diagram 200 of a WTRU 110 and the Node-B 120 of the wireless communication system 100 of FIG. 1. As shown in FIG. 2, the WTRU 110 is in communication with the Node-B 120 and both may be configured to perform methods of MIMO rank selection and/or PMI selection in a WTRU.

In addition to the components that may be found in a typical WTRU, the WTRU 110 includes a processor 115, a receiver 116, a transmitter 117, and an antenna 118. The processor 115 is configured to perform a method of rank and/or precoding matrix index (PMI) measurement and selection in a WTRU. The receiver 116 and the transmitter 117 are in communication with the processor 115. The antenna 118 is in communication with both the receiver 116 and the transmitter 117 to facilitate the transmission and reception of wireless data.

In addition to the components that may be found in a typical base station, the Node-B 120 includes a processor 125, a receiver 126, a transmitter 127, and an antenna 128. The processor 125 may be configured to perform methods of selecting MIMO rank selection and/or PMI selection in a WTRU. The receiver 126 and the transmitter 127 are in communication with the processor 125. The antenna 128 is in communication with both the receiver 126 and the transmitter 127 to facilitate the transmission and reception of wireless data.

Example methods and apparatuses for enhanced MIMO rank and/or PMI measurement and generation are disclosed. Example methods and apparatuses for feedback and reporting of the selected PMI and rank information indicative of the selected rank are also disclosed. Several example methods for enhanced MIMO rank and/or PMI measurement and generation are described in detail; however, these examples are not intended to be limiting.

During MIMO operation the rank information are desirably measured and generated at a receiver or a WTRU and the generated rank information are fed back to a transmitter or an eNodeB. Rank measurement and generation may be performed for MIMO spatial multiplexing for both open-loop and closed-loop schemes.

For spatial multiplexing, the WTRU determines a rank indicating a number of useful transmission layers. For open-loop spatial multiplexing mode, a reported rank equal to one indicates that a transmit diversity should be used, while a reported rank higher than one, (e.g., two, three, or four), indicates that large delay cyclic delay diversity (CDD) with two, three or four corresponding layers should be used.

For closed-loop spatial multiplexing mode, the reported rank indicates a closed-loop precoding with the corresponding number of layers, (e.g., one, two, three or four), should be used.

Table 1 summaries the rank value and the corresponding spatial multiplexing schemes for both open-loop and closed-loop modes.

TABLE 1

| Rank (Number of layers) | Corresponding Open-Loop Spatial Multiplexing Scheme | Corresponding Closed-Loop Spatial Multiplexing Scheme |
| --- | --- | --- |
| 1 | Transmit Diversity | Precoding (one layer) |
| 2 | Large delay CDD (two layers) | Precoding (two layers) |
| 3 | Large delay CDD (three layers) | Precoding (three layers) |
| 4 | Large delay CDD (four layers) | Precoding (four layers) |

The example methods and apparatuses described below may be to determine the desired rank for the current channel condition according to predetermined criteria. These criteria may include a signal-to-interference and noise ratio (SINR)-based metric. Other criteria, such as throughput, block error rate (BLER), system capacity, sum rate-based metrics, etc. may also be used.

Often a single rank measurement and generation, as well as a single rank feedback and reporting are used for a large bandwidth, (e.g., the entire bandwidth). Alternatively, the same methods may be extended to measure and generate multiple ranks for portions of the bandwidth, if desired. For example, a rank for each sub-band or group of sub-bands may be measured and generated. Accordingly, these multiple ranks, (i.e., each for a sub-band or a group of sub-bands), may be fed back and reported as part of a multi-band rank or multi-rank measurement and reporting scheme.

For a 2×2 antenna configuration, 1 bit may be required to represent the rank, (either rank=1 or 2). For a 4×4 antenna configuration, 2 bits may be required to represent the rank, (i.e., rank=1, 2, 3 and 4).

TABLE 2

| | Number of Bits for Rank Feedback |
| --- | --- |
| 2 × 2 MIMO | 1 bit |
| 4 × 4 MIMO | 2 bits |

Figure 3:
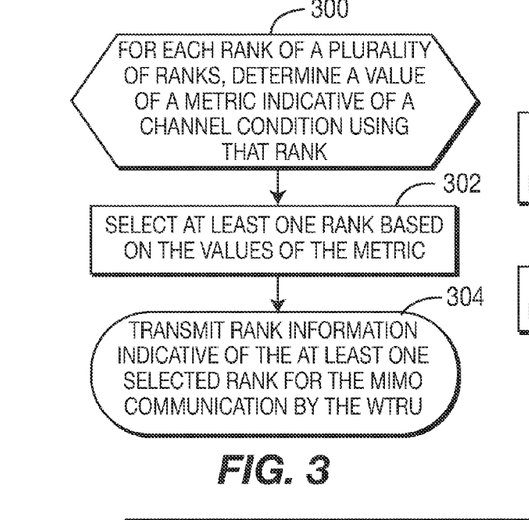
FIG. 3 is a flowchart illustrating an example method for selecting a rank for multiple-input multiple-output (MIMO) communication by a wireless transmit/receive unit (WTRU) according to the present application.

FIG. 3 is a flowchart illustrating an example method for rank measurement and generation in a WTRU using MIMO communication.

For each rank of a plurality of possible ranks, a value of a metric indicative of the channel condition of the MIMO communication by the WTRU using that rank is determined, step 300. This metric may be based on one or more measured quantities indicative of the channel condition, such as signal-to-interference-and-noise ratio (SINR), throughput, a block error rate (BLER), system capacity, or a sum rate.

The rank may then be selected from the plurality of ranks based on the values of the metric, step 302.

For example, if the metric is a sum rate based on SINR, the SINR may be computed based on the channel measurement, (e.g., channel estimation) for each rank, or each sub-band (i.e., resource block (RB)), or resource block group (RGB) thereof. A rate for each sub-band, or RBG, may then be computed based on the measured SINR for the sub-band, or RBG. The overall sum rate is then computed for all sub-bands for each rank by adding the sub-band rates, or RBG rates, of the individual sub-bands, or RBGs. The desired rank is selected based on this overall sum rate, i.e. the rank having the largest sum rate is selected.

The value of the metric for each rank may also be determined by determining a stream sub-value of the metric for each spatial stream used for the MIMO communication. These stream sub-values of the metric may then be added to determine the value of the metric.

In open-loop spatial multiplexing mode rank one corresponds to transmit diversity scheme and rank two or higher corresponds to large delay CDD scheme. A sum rate-based metric is used herein as an example. These example methods involve computing a sum rate for each rank. When computing the sum rate for rank one, a transmit diversity scheme is assumed. The SINR is measured and computed assuming transmit diversity scheme is used. When computing overall rates for rank two or higher, large delay CDD is assumed. The SINR is measured and computed assuming large delay CDD with proper number of layers. Overall rate is then computed based on the computed SINR for each rank.

The SINR for the j-th spatial stream and rank p, i.e. the rank PJ RBG SINR, in the g-th RBG may be expressed as follows:

$$\gamma_g^{(p,j)} = \frac{|w_{g,j,j}^{(p)}|^2}{\sum_{k=1,k \neq j}^{Ns} |w_{g,j,k}^{(p)}|^2 + \sigma_n^2 \sum_{k=1}^{Ns} |z_{g,j,k}^{(p)}|^2}, \quad \text{Equation (1)}$$

$$p = 2, 3, \ldots, P;$$

where $w_{g,j,k}^{(p)}$ and $z_{g,j,k}^{(p)}$ is the (j,k)-th element of matrix $W_g^{(p)}$ and $Z_g^{(p)}$, respectively and Ns is the number of data streams. P=2 for 2×2 MIMO and P=4 for 4×4 MIMO.

Matrix $Z_g^{(p)}$ may be obtained by:

$$Z_g^{(p)} = H_g^{p^H}(H_g^p H_g^{p^H} + R_{In})^{-1}; \quad \text{Equation (2)}$$

where $R_{In}$ is the covariance matrix of interference and/or noise.

The matrix $W_g^{(p)}$ may be obtained by:

$$W_g^{(p)} = Z_g^{(p)} H_g^{(p)}.\qquad\text{Equation (3)}$$

The channel $H_g^{(p)}$ is the averaged effective channel matrix of rank p for the g-th RBG. Large delay CDD may use several matrices. Large delay CDD may use two matrices for two layers, three matrices for three layers and four matrices for four layers. In addition, the matrix may cycle through or hop through different version of the matrix for obtaining diversity gain. The SINR may be averaged over all matrices. The effective channel matrix may be averaged over all matrices to produce a single averaged matrix. The large delay matrix is expressed as follows:

$$T = W(i)D(i)U;\qquad\text{Equation (4)}$$

where W(i) is a matrix pre-selected from a precoding codebook. W(i) may be a single matrix or selected from a subset of precoding codebook. D(i) is a matrix that may depend on the data symbol index i. U is a predetermined fixed matrix. If there is a single matrix for W(i), for 2 transmit antenna configuration there may be two matrices for D(i) if it is two layers as follows:

$$D(i) = \begin{bmatrix} 1 & 0 \\ 0 & e^{-j2\pi i/2} \end{bmatrix}, i = 0, 1.\qquad\text{Equation (5)}$$

If there are multiple matrices for W(i), for 4 transmit antenna configuration assume $W(i) \in \{C_1, C_2, \ldots, C_L\}$, each W(i) combines with a D(i) to produce a new matrix T. There may be three matrices for D(i) if it is three layers as follows:

$$D(i) = \begin{bmatrix} 1 & 0 & 0 \\ 0 & e^{-j2\pi i/3} & 0 \\ 0 & 0 & e^{-j4\pi i/3} \end{bmatrix}, i = 0, 1, 2.\qquad\text{Equation (6)}$$

There may be four matrices for D(i) if it is four layers as follows:

$$D(i) = \begin{bmatrix} 1 & 0 & 0 & 0 \\ 0 & e^{-j2\pi i/4} & 0 & 0 \\ 0 & 0 & e^{-j4\pi i/4} & 0 \\ 0 & 0 & 0 & e^{-j6\pi i/4} \end{bmatrix},\qquad\text{Equation (7)}$$

$i = 0, 1, 2, 3.$

The SINR should be averaged over all matrices D(i) and/or W(i) depending on the way that matrices W(i) are assigned. Once matrix T is determined, the effective channel may be computed accordingly. For each matrix T obtained, a corresponding SINR is computed. Denote the computed SINR as $SINR_1, SINR_2, \ldots, SINR_N$. The averaged SINR may be obtained as follows:

$$SINR_{avg} = \sum_{i=1}^{N} \alpha_i SINR_i.\qquad\text{Equation (8)}$$

where $\alpha_i$ is the weight coefficient for averaging processing.

The SINR for transmit diversity using Alamouti scheme for linear minimum mean square error (LMMSE) or maximum ratio combining (MRC) may be computed for two transmit and one receiving antennas as follows:

$$\gamma_g^{(1,j)} = \frac{|h_{g11}|^2 + |h_{g,12}|^2}{\sigma_n^2}.\qquad\text{Equation (9)}$$

Similarly the SINR for transmit diversity using other schemes may be properly computed. Once the SINR is computed, the overall rate may be computed accordingly:

$$\gamma_g^{(1,1)} = \frac{\sum_{m=1}^{N_r}\sum_{n=1}^{N_t}|h_{g,m,n}|^2}{\sigma_n^2}\qquad\text{Equation (9a)}$$

where $\gamma_g^{(1,1)}$ is the SINR for rank 1 and one stream for transmit diversity. Nt and Nr are the number of antennas at transmitter and receiver respectively.

The sum rate of all spatial streams and all sub-bands or RBGs for rank p may be expressed as follows:

$$\prod^{(p)} = \sum_{g}^{N_g} \sum_{j=1}^{p} \log 2(1 + \gamma_g^{(p,j)}), p = 1, 2, \ldots, P;\qquad\text{Equation (10)}$$

where Ng is the number of RBGs in the configured system bandwidth. A single rank is selected. The rank that maximizes the overall rates across all RBGs is selected, $$Rank_{sel} = \arg\max_{p \in \Omega_p} \prod^{(p)};\qquad\text{Equation (11)}$$

where $\Omega_p$ is a set of allowable rank, i.e., $\Omega_p = \{1, 2, \ldots, P\}$. Typically, for 4×4 MIMO configuration $\Omega_p = \{1,2,3,4\}$. Maximum rank equals four. If p=1 is selected, it indicates transmit diversity is preferred. If p=2, 3 or 4 are selected, it indicates large delay CDD with two, three or four layers are preferred.

In closed-loop spatial multiplexing mode, rank x corresponds to a small delay CDD scheme with x layers. Value of x may be one to four for 4×4 antenna configuration and one or two for 2×2 antenna configuration. A sum rate-based metric is used herein as an example. These example methods involve computing the overall rate for each rank. The SINR is measured and computed assuming small delay CDD with proper number of layers.

When sum rate criteria are used, the SINR may be desirably computed for each given rank. The sum rate is then computed based on the computed SINR. An example procedure for measuring and generating rank information using sum rate criteria is described as follows:

Step 1: The bandwidth is partitioned into several sub-bands or RBGs of proper size for measurement and channel averaging purpose. The size may be chosen by implementation for optimum performance.

Step 2: For each sub-band or RBG, an SINR for each rank is computed. The rank is 1, 2, ..., P, where P is the maximum rank for a given antenna configuration of an eNodeB and a WTRU. For example if antenna configuration is 4×4, the maximum rank P=4. The SINR is computed for each spatial stream for each rank.

Step 3: For each sub-band or RBG, a data rate is computed for each rank based on the SINR computed in each sub-band or RBG. If the rank is one, data rate is computed for one layer.

Step 4: A corresponding overall sum rate of all sub-bands or RBGs is computed for each rank=1, 2, ..., P using the previously computed sum rates for each sub-band or RBG.

Step 5: A rank that has the highest overall sum rate is selected.

Denote $H_g^{(p)}$ the averaged effective channel matrix of rank p for the g-th sub-band or RBG. The averaged effective channel matrix of rank p for the g-th sub-band or RBG, $H_g^{(p)}$, is obtained by a multiplication of channel matrix $H_g$ and precoding matrix $T_g^{(p)}$ of rank p for the g-th sub-band or RBG, as follows:

$$H_g^{(p)} = H_g T_g^{(p)}. \quad \text{Equation (12)}$$

The SINR for the j-th spatial stream for rank p in the g-th sub-band or RBG may be expressed as follows:

$$\gamma_g^{(p,j)} = \frac{1}{\sigma_n^2 [(H_g^p H_g^{pH} + \sigma_n^2 I)^{-1}]_{j,j}} - 1. \quad \text{Equation (13)}$$

Alternative measurement for SINR for the j-th spatial stream and rank p in the g-th sub-band or RBG may be expressed as follows:

$$\gamma_g^{(p,j)} = \frac{|w_{g,j,j}^{(p)}|^2}{\sum_{k=1, k \neq j}^{Ns} |w_{g,j,k}^{(p)}|^2 + \sigma_n^2 \sum_{k=1}^{Ns} |z_{g,j,k}^{(p)}|^2}; \quad \text{Equation (14)}$$

where $w_{g,j,k}^{(p)}$ and $z_{g,j,k}^{(p)}$ is the (j,k)-th element of matrix $W_g^{(p)}$ and $Z_g^{(p)}$ respectively. Matrix $Z_g^{(p)}$ may be obtained by:

$$Z_g^{(p)} = H_g^{pH}(H_g^p H_g^{pH} + R_{In})^{-1}; \quad \text{Equation (15)}$$

where $R_{In}$ is the covariance matrix of interference and noise. The matrix $W_g^{(p)}$ may be obtained by:

$$W_g^{(p)} = Z_g^{(p)} H_g^{(p)}. \quad \text{Equation (16)}$$

The sum rate of all spatial streams and all sub-bands or RBGs for rank p may be expressed as follows:

$$\prod^{(p)} = \sum_{g}^{N_g} \sum_{j=1}^{p} \log 2(1 + \gamma_g^{(p,j)}), \, p = 1, 2, \ldots, P; \quad \text{Equation (17)}$$

where Ng is the number of sub-bands or RBGs in the configured system bandwidth. A single value for rank is selected for a large bandwidth. The rank that maximizes the overall rates across all sub-bands or RBGs is selected, as follows:

$$Rank_{sel} = \underset{p, p \in \Omega_p}{\arg \max} \prod^{(p)}; \quad \text{Equation (18)}$$

where $\Omega_p$ is a set of allowable ranks, (i.e., $\Omega_p = \{1, 2, \ldots, P\}$). For 4×4 MIMO configuration, $\Omega_p = \{1,2,3,4\}$ and the maximum rank is four.

It is contemplated that a second rank which has the second highest overall rates or the second best metric may also be selected. In this example embodiment, the WTRU may signal the first and second ranks that have the highest overall rates or the best metric (primary rank) and the second highest overall rates or the second best metric (secondary rank), respectively. This allows the network to have more flexibility to assign the rank and schedule the resources for data transmission if the first rank, or primary rank, may not be desirable from a network perspective. The network may signal to the WTRU, indicating whether the second best rank should be reported or not. Such indication may be done semi-statically or dynamically.

In a further example embodiment, the best K ranks may be selected which have the K highest overall rates or the K best metric. The WTRU may signal the best K ranks to allow network to have flexibility to assign the number of data streams and schedule the resources for data transmission if the some rank(s) is(are) not desirable from a network perspective. The network may signal to the WTRU, indicating whether the best K ranks should be reported or not. Such indication may be done semi-statically or dynamically.

Once the desired rank for MIMO communication by the WTRU has been selected rank information indicative of the selected rank is transmitted by the WTRU, step 304. When reporting rank information, the WTRU desirably reports a single instance of the number of useful transmission layers.

For each rank reporting interval for closed-loop spatial multiplexing mode, a WTRU determines a rank from the supported set of rank values for the corresponding antenna configuration of the eNodeB and the WTRU and reports the number in each rank report.

For each rank reporting interval for open-loop spatial multiplexing mode, a WTRU determines a rank from the supported set of rank values for the corresponding antenna configuration of the eNodeB and the WTRU and reports the number in each rank report.

A WTRU may perform aperiodic rank reporting using the physical uplink shared channel (PUSCH) upon receiving an indication sent in a downlink scheduling grant. The minimum reporting interval for aperiodic reporting of rank information may be one subframe. A WTRU may be semi-statically configured by higher layers to feed back rank information on the PUSCH using one of the reporting modes.

The rank value that the WTRU determines may also be used for selecting the precoding matrix index (PMI) and the calculation of the channel quality index (CQI). Rank and PMI may be computed and determined separately. Alternatively, the rank and PMI may be computed and determined jointly by WTRU.

A WTRU may be semi-statically configured by higher layers to periodically feed back rank information on the physical uplink control channel (PUCCH) using one of the reporting modes. The reporting interval of rank information reporting may desirably be an integer multiple of wideband CQI and/or PMI reporting period. The offset between rank information reporting and wideband CQI and/or PMI reporting instances is configured and the same or different offset values may be used for rank and CQI/PMI reporting. Both the reporting interval and offset may be configured by higher layers. In case of collision of rank information and wideband CQI and/or PMI reporting, it may be desirable for the rank information to be transmitted and the wideband CQI and/or PMI reporting to be discarded. In this case, rank information is considered to be more important than CQI and/or PMI.

In addition to selecting a desired rank for MIMO communication be a WTRU, it may be desirable to select a PMI from among a plurality of possible PMIs as well. For MIMO communication with precoding, two example approaches for PMI and rank selection are described in detail below—a joint approach for rank and PMI selection and generation, and a separate measurement approach for rank and PMI selection and generation. In the joint approach, rank and PMI are measured and selected jointly. In the separate measurement approach, rank and PMI are generated separately and individually. Thus, the joint approach uses one stage processing while separate measurement approach uses two stages processing.

In the separate measurement approach, for each PMI of a plurality of PMIs, a PMI value of the metric using the selected rank may be determined. One PMI is then selected from the plurality of PMIs based on the PMI values of the metric and the selected PMI is then transmitted.

As an example of this approach, continuing the example described above using SINR and a sum rate as the metric, an SINR for LMMSE may be computed for each sub-band or RBG for the selected rank assuming open-loop MIMO communication. A corresponding data rate for each sub-band or RBG for each rank may then calculated using the computed SINR for that sub-band or RBG. The overall rates for all sub-bands or RBGs are summed up. The rank that produces the highest overall sum rate is then selected. Once the rank is selected, a corresponding precoding matrix is selected as follows. Given the selected rank, an SINR is computed for each PMI for each RBG. An overall sum rate is calculated by summing up the data rates of all RBGs for each precoding matrix. The desired precoding matrix is then selected for the selected rank in open loop MIMO as the precoding matrix having the highest sum rate for the selected rank.

An SINR for LMMSE may be computed for each RBG for given rank and precoding matrix. The corresponding data rate for each RBG may be calculated using the computed SINR for that RBG. The overall rates for all RBGs may be calculated for the given rank and precoding matrix. The SINR for the j-th spatial stream for given precoding matrix $F_i$ and rank p may be expressed as follows:

$$\gamma_g^{(p,j)} = \frac{|w_{g,j,j}^{(p)}|^2}{\sum_{k=1,k \neq j}^{Ns} |w_{g,j,k}^{(p)}|^2 + \sigma_n^2 \sum_{k=1}^{Ns} |z_{g,j,k}^{(p)}|^2};$$

Equation (19)

where $w_{g,j,k}^{(p)}$ and $z_{g,j,k}^{(p)}$ is the (j,k)-th element of matrix $W_g^{(p)}$ and $Z_g^{(p)}$ respectively. The channel $H_g^{(p)}$ is the averaged channel matrix of rank p for the g-th RBG.

Matrix $Z_g^{(p)}$ may be obtained by:

$$Z_g^{(p)} = H_g^{pH}(H_g^p H_g^{pH} + R_{In})^{-1};$$

Equation (20)

where $R_{In}$ is the covariance matrix of interference and/or noise.

The matrix $W_g^{(p)}$ may be obtained by:

$$W_g^{(p)} = Z_g^{(p)} H_g^{(p)}.$$

Equation (21)

For single PMI measurement, the sum rate of all spatial streams and all RBGs for rank p and PMI i may be expressed as follows:

$$\prod_i^{(p)} = \sum_g^{Ng} \sum_{j=1}^{Ns} \log2(1 + \gamma_{g,i}^{(p,j)});$$

Equation (22)

where Ns is the maximum number of data streams and Ng is the number of RBGs to be considered.

The PMI that maximizes the overall rates across all RBGs is selected, $$PMI_{sel} = \underset{i}{\mathrm{argmax}} \prod_i^{(p)}.$$

Equation (23)

It is contemplated that a second PMI which has the second highest overall rates or the second best metric may also be selected. In this example embodiment, the WTRU may signal the first and second PMIs that have the highest overall rates or the best metric (primary rank) and the second highest overall rates or the second best metric (secondary rank), respectively. This allows the network to have more flexibility to assign the PMI and schedule the resources for data transmission if the primary PMI is not desirable from a network perspective. The network may signal to the WTRU, indicating whether the second best PMI should be reported or not. Such indication may be done semi-statically or dynamically.

In a further example embodiment, the best K PMIs may be selected which have the K highest overall rates or the K best metrics. The WTRU may signal the best K PMIs to allow network to have flexibility to assign the PMI and schedule the resources for data transmission if the some PMIs are not desirable from a network perspective. The network may signal to the WTRU, indicating whether the best K PMIs should be reported or not. Such indication may be done semi-statically or dynamically.

For multiple PMI measurement, the sum rate of all spatial streams for g-th RB and PMI i given rank p may be expressed as follows:

$$\prod_{g,i}^{(p)} = \sum_{j=1}^{Ns} \log2(1 + \gamma_{g,i}^{(p,j)}).$$

Equation (24)

The PMI that maximizes the rate for each RBG is selected, $$PMI_{g,sel} = \underset{i}{\mathrm{argmax}} \prod_{g,i}^{(p)}.$$

Equation (25)

It is contemplated that a second PMI which has the second highest overall rates or the second best metric may be selected for each subband or RBG. In this example embodiment, the WTRU may signal the first and second PMIs that have the highest overall rates or the best metric (primary rank) and the second highest overall rates or the second best metric (secondary rank), respectively. This allows the network to have more flexibility to assign the PMI and schedule the resources for data transmission for each RBG if the primary PMI is not desirable from a network perspective for that particular RBG. The network may signal to the WTRU, indicating whether the second best PMI for certain RBG or RBGs should be reported or not. Such indication may be done semi-statically or dynamically.

In a further example embodiment, the best K PMIs for each subband or RBG may be selected which have the K highest overall rates or the K best metrics for that subband or RBG. The WTRU may signal the best K PMIs for each subband or RBG to allow network to have flexibility to assign the PMI and schedule the resources for data transmission if some of PMIs are not desirable from a network perspective. The network may signal to the WTRU, indicating whether the best K PMIs for each subband or RBG should be reported or not. Such indication may be done semi-statically or dynamically.

Figure 5:
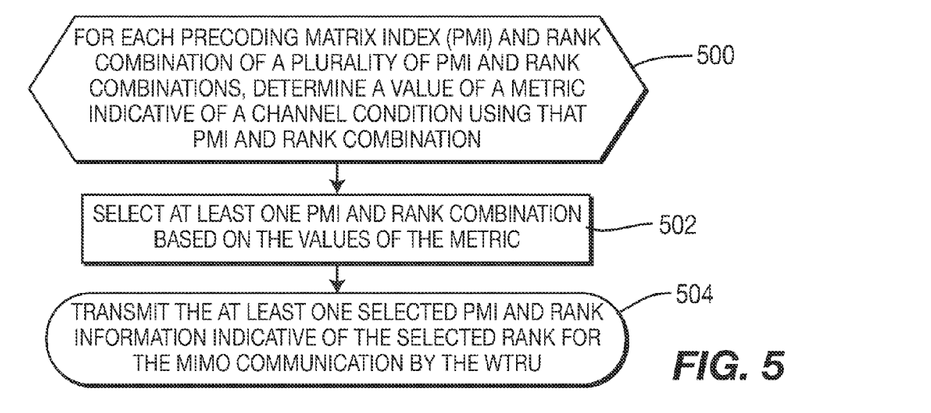
FIG. 5 is a flowchart illustrating an example method for selecting a joint PMI and rank for MIMO communication by a WTRU according to the present application.

For MIMO communication with precoding, the rank measurement may be performed jointly with precoding matrix selection. FIG. 5 illustrates an example method for joint selection of a PMI from a plurality of PMIs and a rank from a plurality of ranks for MIMO communication by a WTRU. In this example method only one stage joint processing is used.

For each PMI and rank combination, a value of a metric indicative of a channel condition of the MIMO communication by the WTRU using that PMI and rank is determined, step 500. This metric may be based on one or more measured quantities indicative of the channel condition, such as signal-to-interference-and-noise ratio (SINR), throughput, a block error rate (BLER), system capacity, or a sum rate.

The PMI and rank combination may then be selected from the plurality of PMI and rank combinations based on the values of the metric, step 502.

For example, if the metric is a sum rate based on SINR, the SINR may be computed based on the channel measurement, (e.g., channel estimation) for each PMI and rank combination. Alternatively, the SINR for each PMI and rank combination on each sub-band (i.e., resource block (RB)), or resource block group (RGB) may be measured. A rate for each sub-band, or RBG, may then be computed based on the measured SINR for the sub-band, or RBG. The overall sum rate is then computed for all sub-bands for each PMI and rank combination by adding the sub-band rates, or RBG rates, of the individual sub-bands, or RBGs. The desired PMI and rank combination is selected based on this overall sum rate, i.e. the PMI and rank combination having the largest sum rate is selected.

Using Equations 19-21, the sum rate of all spatial streams and all RBGs for rank p and PMI i may be expressed as follows:

$$\prod_i^{(p)} = \sum_g^{N_g} \sum_{j=1}^{N_s} \log2(1 + \gamma_{g,i}^{(p,j)});$$

Equation (26)

where Ns is the maximum number of data streams. A single rank is selected. The rank and PMI that maximize the overall rates across all RBGs are jointly selected, $$[Rank_{sel}, PMI_{sel}] = \underset{p,i}{\mathrm{argmax}} \prod_i^{(p)}.$$

Equation (27)

Once the desired PMI and rank combination for MIMO communication by the WTRU has been selected, the selected PMI and rank information indicative of the selected rank is transmitted by the WTRU, step 504.

It is contemplated that a second combination of PMI and rank which has the second highest overall rates or the second best metric may also be selected. In this example embodiment, the WTRU may signal both the first and second combination of PMI and rank that have the highest overall rates or the best metric (primary rank/PMI) and the second highest overall rates or the second best metric (secondary rank/PMI), respectively. This allows the network to have more flexibility to assign the rank and PMI and schedule the resources for data transmission if the primary combination of rank and PMI is not desirable from a network perspective. For multi-RBG combinations of rank and PMI measurement, a best combination of rank and PMI is selected for each RBG. In addition, a second best combination of rank and PMI may be selected for each RBG. The network may signal to the WTRU, indicating whether the second best combination of rank and PMI should be reported or not. Such indication may be done semi-statically or dynamically.

In a further example embodiment, the best K combinations of rank and PMI may be selected which have the K highest overall rates or the K best metrics. The WTRU may signal the best K combinations of rank and PMI to allow network to have flexibility to assign the number of data streams and PMI and schedule the resources for data transmission if the some rank and/or PMI are not desirable from a network perspective. The network may signal to the WTRU, indicating whether the best K combinations of rank and PMIs should be reported or not. Such indication may be done semi-statically or dynamically.

A WTRU may perform aperiodic PMI and rank reporting using the PUSCH upon receiving an indication sent in a downlink scheduling grant. The minimum reporting interval for aperiodic reporting of PMI and rank information may be one subframe. A WTRU may be semi-statically configured by higher layers to feed back PMI and rank information on the PUSCH using one of the reporting modes. The PMI and rank value that the WTRU determines may also be used for the calculation of the CQI.

A WTRU may be semi-statically configured by higher layers to periodically feed back PMI and rank information on the PUCCH using one of the reporting modes. The reporting interval of rank information reporting may desirably be an integer multiple of wideband CQI and/or PMI reporting period. The offset between rank information reporting and wideband CQI and/or PMI reporting instances is configured and the same or different offset values may be used for rank and CQI/PMI reporting. Both the reporting interval and offset may be configured by higher layers. In case of collision of rank information and wideband CQI and/or PMI reporting, it may be desirable for the rank information to be transmitted and the wideband CQI and/or PMI reporting to be discarded.

Figure 4:
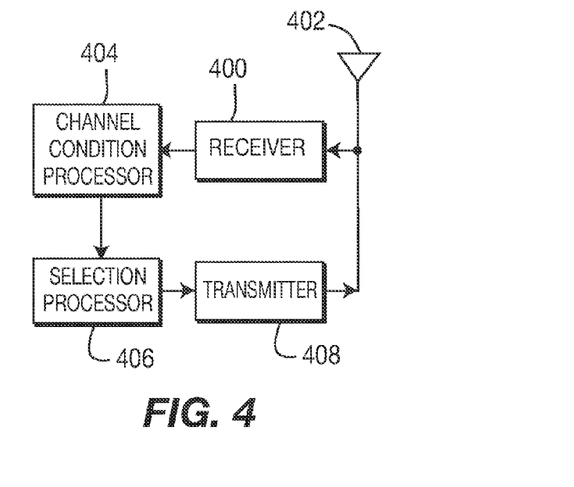
FIG. 4 is a schematic block diagram illustrating an example WTRU configured to select a rank and/or precoding matrix index (PMI) for MIMO communication according to the present application.

FIG. 4 illustrates an example WTRU configured for MIMO communication that may be used to perform the various method of the present application. The example WTRU includes: receiver 400; channel condition processor 404, which is coupled to receiver 400; selection processor 406, which is coupled to channel condition processor 404; transmitter 408, which is coupled to selection processor 406; and antenna array 402, which is coupled to receiver 400 and transmitter 408.

Receiver 400 is configured to receive a signal detected by antenna array 402, which it then relays to channel condition processor 404. Channel condition processor 404 is configured to determine the value of a metric indicative of channel condition based on the received signal. Channel condition processor 404 may be configured such that the metric values are determined for each of a plurality of ranks, a plurality of PMIs, or a plurality of PMI and rank combinations. The metric may be based on at least one of SINR, throughput, BLER, system capacity, or a sum rate.

Further, for each rank of the plurality of PMIs and/or ranks, channel condition processor 404 may be configured to determine the value of the metric determining a stream sub-value (or RBG sub-value) of the metric for each spatial stream (or RBG) used for the MIMO communication and then adding the stream sub-values (or RBG sub-values) of the metric to determine the value of the metric.

Selection processor 406 (or joint selection processor in the case of joint selection of PMI and rank) is configured to select the PMI and/or rank from the plurality of ranks based on the values of the metric determined by channel condition processor 404.

Transmitter 408 is configured to transmit the selected PMI and/or rank information indicative of the selected rank.

It is noted that channel condition processor 404, selection processor 406, and transmitter 408 may be configured to perform any of the channel condition determination, selection, and transmission procedures disclosed above with respect to the example methods of FIGS. 3 and 5 or below with respect to the example methods of FIG. 6.

Figure 6:
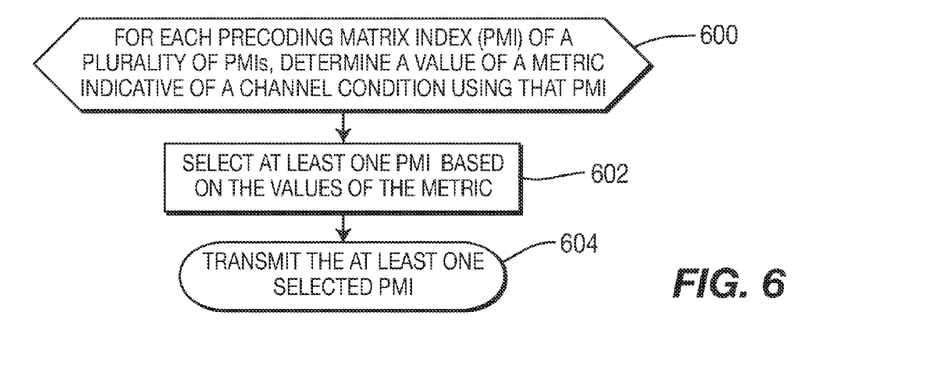
FIG. 6 is a flowchart illustrating an example method for selecting a PMI for MIMO communication by a WTRU according to the present application.

FIG. 6 illustrates an example method for selecting a PMI from a plurality of PMIs for MIMO communication by a WTRU. This example method may include procedures for PMI selection and generation for advanced WTRUs, such as advanced WTRUs using minimum mean square error (MMSE) successive interference cancellation (SIC). Example procedures for PMI selection and generation for different MIMO precoding configurations, such as wideband precoding, M-sub-band precoding, and per-sub-band precoding, may also be included.

PMI selection may be based on various criteria. Several criteria of PMI selection include minimum mean square error (MMSE) based, channel capacity based and correlation based criteria.

For each PMI of the plurality of PMIs, the value of a metric indicative of a channel condition of the MIMO communication by the WTRU using that PMI is determined, step 600. This metric may be based on one or more measured quantities indicative of the channel condition, such as signal-to-interference-and-noise ratio (SINR), throughput, a block error rate (BLER), system capacity, or a sum rate.

The PMI may then be selected from the plurality of PMIs based on the values of the metric, step 602.

For example, if the metric is a sum rate based on SINR, the SINR may be computed based on the channel measurement, (e.g., channel estimation) for each PMI. Alternatively, the SINR for each PMI on each sub-band (i.e., resource block (RB)), or resource block group (RGB) may be measured. A rate for each sub-band, or RBG, may then be computed based on the measured SINR for the sub-band, or RBG. The overall sum rate is then computed for all sub-bands for each PMI by adding the sub-band rates, or RBG rates, of the individual sub-bands, or RBGs. The desired PMI is selected based on this overall sum rate, i.e. the PMI having the largest sum rate is selected.

In the following description of an example of the channel condition determination and selection step according to FIG. 6, $\Omega$ is used to denote a codebook or a set of candidate precoding matrix F, such as a Discrete Fourier Transform (DFT) or a Householder (HH) matrix. H and $H_{eff}$ are used to denote channel state information (CSI) and effective CSI, respectively. The effective CSI is generated from H for a particular precoding matrix F by the following equation:

$$H_{eff} = HF. \quad \text{Equation (28)}$$

When a MMSE linear detection receiver is used, depending on MMSE detection form is used, the mean square error (MSE) may be expressed in accordance with the following equation:

$$MSE(F) = \left(H_{eff}^H H_{eff} + \frac{1}{\rho}I\right)^{-1}; \quad \text{Equation (29a)}$$

or $$MSE(F) = \left(H_{eff} H_{eff}^H + \frac{1}{\rho}I\right)^{-1}, \quad \text{Equation (29b)}$$

where $\rho$ is the signal-to-noise ratio.

In one approach, the PMI is selected if the corresponding MSE is minimized, i.e., select F if the trace of MSE in Equation (2) is minimized in accordance with:

$$F = \underset{F_i \in \Omega}{\arg\min}\, tr(MSE(F_i)). \quad \text{Equation (30)}$$

Channel capacity for a given H and F (or the effective channel $H_{eff}$) may be expressed for two different linear minimum mean square error (LMMSE) forms by:

$$\text{Capacity}(F) = \log_2 \det\left(H_{eff}^H H_{eff} + \frac{1}{\rho}I\right); \quad \text{Equation (31a)}$$

or $$\text{Capacity}(F) = \log_2 \det\left(H_{eff} H_{eff}^H + \frac{1}{\rho}I\right). \quad \text{Equation (31b)}$$

In another approach, the PMI is selected to maximize the channel capacity, i.e., select F by the following rule:

$$F = \underset{F_i \in \Omega}{\arg\min}\, \text{Capacity}(F_i). \quad \text{Equation (32)}$$

A further approach for selecting the PMI involves estimating the channel responses H and performing a singular value decomposition (SVD) on the estimated H to obtain a precoding matrix V. For N streams MIMO transmission where $1 \leq N \leq N_t$, let A be the sub-matrix of V that is used to precode the N stream data. Furthermore let $B_i$ be the possible combinations of N column vectors of matrix F. Search all the possible combinations of column vectors of F, i.e., all the possible $B_i$ and find the one which maximize the sum of norm of the inner product or correlation of A and $B_i$ in the search such that:

$$T = \max_{B_i} \sum_{j=1}^{N} \| < A(:, j)^*, B_i(:, j) > \|. \quad \text{Equation (33)}$$

Precoding matrix selection may also be performed based on sum rate criteria. SINR for LMMSE may be computed for each precoding matrix F. Depending on the type of LMMSE used, the SINR for the j-th spatial stream for precoding matrix $F_i$ may be expressed by:

$$\gamma_g^{(j)}(F_i) = \frac{1}{\sigma_n^2[(HF_i F_i^H H^H + \sigma_n^2 I)^{-1}]_{j,j}} - 1; \quad \text{Equation (34a)}$$

or

-continued $$\gamma_g^{(j)}(F_i) = \frac{1}{\sigma_n^2[(F_i^H H^H H F_i + \sigma_n^2 I)^{-1}]_{j,j}} - 1, \quad \text{Equation (34b)}$$

where H is the average channel matrix within a resource block group (RBG).

The sum rate for the i-th precoding matrix $F_i$ and for the g-th RBG may be expressed by:

$$\prod_g (F_i) = \sum_{j=1}^{Ns} \log 2(1 + \gamma_g^{(j)}(F_i)), \quad \text{Equation (35)}$$

where Ns is the number of data streams. The precoding matrix Fi that maximizes sum rate is selected, $$F_{sel} = \operatorname*{argmax}_{F_i \in \Omega} \prod_g (F_i). \quad \text{Equation (36)}$$

SINR for LMMSE may be computed for each precoding matrix $F_i$ and for each spatial stream. The SINR for the j-th spatial stream for precoding matrix $F_i$ may be expressed by:

$$\gamma_g^{(j)} = \frac{|w_{g,j,j}|^2}{\sum_{k=1,k \neq j}^{Ns} |w_{g,j,k}|^2 + \sigma_n^2 \sum_{k=1}^{Ns} |z_{g,j,k}|^2}, \quad \text{Equation (37)}$$

where $w_{g,j,k}$ and $z_{g,j,k}$ is the (j,k)-th element of matrix $W_g$ and $Z_g$ respectively.

Matrix $Z_g$ may be obtained by:

$$Z_g = H_{\mathit{eff},g}^H (H_{\mathit{eff},g} H_{\mathit{eff},g}^H + R_{In})^{-1} \quad \text{Equation (38)}$$

where $R_{In}$ is the covariance matrix of interference and noise.

The matrix $W_g$ may be obtained by:

$$W_g = Z_g H_{\mathit{eff},g}. \quad \text{Equation (39)}$$

The effective channel matrix $H_{\mathit{eff},g}$ for the i-th precoding matrix Fi and the g-th RBG may be obtained by:

$$H_{\mathit{eff},g} = H_g F_i. \quad \text{Equation (40)}$$

The sum rate for the i-th precoding matrix $F_i$ and for the g-th RBG may be expressed by:

$$\prod_g (F_i) = \sum_{j=1}^{Ns} \log 2(1 + \gamma_g^{(j)}(F_i)), \quad \text{Equation (41)}$$

where Ns is the number of data streams. The precoding $F_i$ that maximizes sum rate for the g-th RBG is selected, $$F_{sel,g} = \arg\max_{F_i \in \Omega} \prod_g (F_i). \quad \text{Equation (42)}$$

SINR for MMSE-SIC may be computed for each precoding matrix $F_i$ and for each spatial stream j. The SINR for the codeword that is detected first is the same as SINR for MMSE. The SINR for the j-th spatial stream for precoding matrix $F_i$ is shown in Equation (37).

The post detection SINR depends on the detection order of SIC. For MIMO 2×2 if detection starts with codeword 1 (CW1 or the first layer), the SINR for CW1 is computed using Equation (37) letting j=1.

For CW2 (or the second layer) the interference cancellation is taken into account. Assume SIC perfectly removes the interference arising from CW1. The equation is reduced to rank one transmission instead of rank two. The effective channel matrix $H_{\mathit{eff},g}$ for the i-th precoding matrix $F_i$ and the g-th RBG becomes a 2×1 matrix and may be obtained by:

$$H_{\mathit{eff},g}^2 = H_g F_i(:,2), \quad \text{Equation (43)}$$

where $F_i(:,2)$ indicates the second column vector of matrix $F_i$.

Matrix $Z_g^{(2)}$ with dimension of 1×2 may be obtained by:

$$Z_g^{(2)} = H_{\mathit{eff},g}^{(2)H} (H_{\mathit{eff},g}^{(2)} H_{\mathit{eff},g}^{(2)H} + R_{In})^{-1}. \quad \text{Equation (44)}$$

Scalar $W_g^{(2)}$ may be obtained by:

$$W_g^{(2)} = Z_{\mathit{eff},g}^{(2)} H_{\mathit{eff},g}^{(2)}. \quad \text{Equation (45)}$$

The SINR for the 2nd spatial stream for precoding matrix $F_i$ may be expressed by:

$$\gamma_g^{(2)} = \frac{|w_{g,j,j}^{(2)}|^2}{\sigma_n^2 \sum_{k=1}^{Ns} |z_{g,j,k}^{(2)}|^2}, \quad \text{Equation (46)}$$

where $w_{g,j,k}^{(2)}$ and $z_{g,j,k}^{(2)}$ is the (j,k)-th element of matrix $W_g^{(2)}$ and $Z_g^{(2)}$ respectively.

The sum rate for the i-th precoding matrix $F_i$ and for the g-th RBG may be expressed by:

$$\prod_g (F_i) = \sum_{j=1}^{Ns} \log 2(1 + \gamma_g^{(j)}(F_i)), \quad \text{Equation (47)}$$

where Ns is the number of data streams. The precoding matrix $F_i$ that maximizes sum rates for the g-th RBG is selected, $$F_{sel,g} = \arg\max_{F_i \in \Omega} \prod_g (F_i). \quad \text{Equation (48)}$$

From Equations (37), (46) and (47) it may be observed that the SIC detection order affects the calculated SINR for the first and second CW. If the 1st CW is processed first and then the 2nd CW is detected, we have $\gamma_g^{(1)}$ and $\gamma_g^{(2)}$. If the 2nd CW is processed first and then the $1^{st}$ CW is detected, we have $\gamma_g^{(1)'}$ and $\gamma_g^{(2)'}$. This is because the first processed CW only uses MMSE detection. SINR depends on both CWs signal strength and the interference arising from the other CWs. Choosing different CW as the CW being processed first results in different SINR. Furthermore, SINR for the CW takes into account of SIC and thus depends only on its own signal strength and noise level, not interference from the other CW. This is based on the post detection SINR.

The sum rates are computed for each $F_i$ for $[\gamma_g^{(1)}, \gamma_g^{(2)}]$ and $[\gamma_g^{(1)'}, \gamma_g^{(2)'}]$ as follows:

$$\prod_g (F_i) = \sum_{j=1}^{2} \log 2(1 + \gamma_g^{(j)}(F_i)); \quad \text{Equation (49)}$$

and $$\prod_g{}' (F_i) = \sum_{j=1}^{2} \log 2(1 + \gamma_g^{(j)'}(F_i)). \quad \text{Equation (50)}$$

The computed sum rates, $\Pi_g(F_i)$ and $\Pi_g'(F_i)$ in Equations (49) and (50), are different from each other for different detection order of SIC. The SIC detection order may be determined based on criteria that the sum rates in Equations (49) and (50) are maximized. The detection order may be selected if the overall rates for the given detection order is greatest. Rank, PMI, CQI, or combinations of rank, PMI and/or CQI may be generated accordingly using the approaches described previously.

In wideband precoding, a single precoding matrix is generated for the entire bandwidth. The size of RBG is chosen such that the averaged channel responses are sufficiently good. Once the RBG size is determined, the entire bandwidth may be divided into multiple RBGs, say $N_G$. In each RBG a rate may be calculated accordingly. The sum rate for the i-th precoding matrix $F_i$ and for the g-th RBG may be expressed by:

$$\prod_g (F_i) = \sum_{j=1}^{Ns} \log 2(1 + \gamma_g^{(j)}(F_i)), \quad \text{Equation (51)}$$

where Ns is the number of data streams. The overall rate of the entire bandwidth is sum of all of individual rate of each RBG as:

$$\prod_T (F_i) = \sum_{g=1}^{N_G} \prod_g (F_i), \quad \text{Equation (52)}$$

where $N_G$ is the number of RBGs for the entire bandwidth. The precoding matrix $F_i$ that maximizes sum rate for the entire bandwidth is selected, $$F_{sel} = \arg\max_{F_i \in \Omega} \prod_T (F_i). \quad \text{Equation (53)}$$

In M-sub-band precoding a single precoding matrix is generated for the M preferred sub-bands in the given bandwidth. A given bandwidth is a set of sub-bands S, i.e., the M preferred sub-bands within the set of sub-bands S. M-sub-band precoding corresponds to WTRU selected sub-bands precoding and feedback. The size of RBG is chosen such that the averaged channel responses are sufficiently good. Once the RBG size is determined, each sub-band may be divided into one or multiple RBGs, say $G_S$. In each RBG a rate may be calculated accordingly. Assume $N_S$ sub-bands in a set of sub-bands S. There are totally Q combinations for M-sub-bands when choosing M sub-bands among $N_S$ sub-bands, such as:

$$Q = C_M^{Ns}. \quad \text{Equation (54)}$$

The sum rate for the i-th precoding matrix $F_i$ and for the g-th RBG in the q-th combination may be expressed by:

$$\prod_g^q (F_i) = \sum_{j=1}^{Ns} \log 2(1 + \gamma_g^{(j)}(F_i)), \quad \text{Equation (55)}$$

where Ns is the number of data streams. The rate of each of the Q combination (I.e., each M-sub-band) is sum of all of individual rate of each RBG in each sub-band and sum of all the M sub-bands. For the q-th combination the rate is calculated as $$\prod_T^q (F_i) = \sum_{g=1}^{M \cdot G_s} \prod_g^q (F_i). \quad \text{Equation (56)}$$

Denoting the set of Q combination as $\Omega_Q$, the precoding matrix $F_i$ and the q-th combination that maximizes overall rate for the M sub-bands are jointly selected in accordance with the following equation:

$$(F_{sel}, b) = \arg\max_{\substack{F_i \in \Omega \\ q \in \Omega_Q}} \prod_T^q (F_i). \quad \text{Equation (57)}$$

In per-sub-band precoding a single precoding matrix is generated for each sub-band in a set of sub-bands S. Per-sub-band precoding corresponds to multiple precoding feedback. The size of RBG is chosen such that the averaged channel responses are sufficiently good. Once the RBG size is determined, each sub-band may be divided into one or multiple RBGs, say $G_S$. In each RBG a rate may be calculated accordingly. Assume $N_S$ sub-bands in a set of sub-bands S. The sum rate for the i-th precoding matrix $F_i$ and for the g-th RBG may be expressed as:

$$\prod_g (F_i) = \sum_{j=1}^{Ns} \log 2(1 + \gamma_g^{(j)}(F_i)), \quad \text{Equation (58)}$$

where Ns is the number of data streams. The rate of each sub-band is sum of all of individual rate of RBG in each sub-band as:

$$\prod_S (F_i) = \sum_{g=1}^{G_S} \prod_g (F_i). \quad \text{Equation (59)}$$

The precoding matrix $F_i$ that maximizes rate of the sub-band is selected in accordance with:

$$F_{sel} = \arg\max_{F_i \in \Omega} \prod_S (F_i). \quad \text{Equation (60)}$$

An example codebook of containing eight DFT matrix with different phase shifts is as follows:

$$F_{4\times 4,0} = \begin{bmatrix} 1 & 1 & 1 & 1 \\ 1 & e^{j\frac{1}{2}\pi} & e^{j\pi} & e^{-j\frac{1}{2}\pi} \\ 1 & e^{j\pi} & e^{j2\pi} & e^{j\pi} \\ 1 & e^{-j\frac{1}{2}\pi} & e^{j\pi} & e^{j\frac{1}{2}\pi} \end{bmatrix};$$

$$F_{4\times 4,1} = \begin{bmatrix} 1 & 1 & 1 & 1 \\ e^{j\frac{1}{16}\pi} & e^{j\frac{9}{16}\pi} & e^{-j\frac{15}{16}\pi} & e^{-j\frac{7}{16}\pi} \\ e^{j\frac{1}{8}\pi} & e^{-j\frac{7}{8}\pi} & e^{j\frac{1}{8}\pi} & e^{-j\frac{7}{8}\pi} \\ e^{j\frac{3}{16}\pi} & e^{-j\frac{5}{16}\pi} & e^{-j\frac{13}{16}\pi} & e^{j\frac{11}{16}\pi} \end{bmatrix};$$

$$F_{4\times 4,2} = \begin{bmatrix} 1 & 1 & 1 & 1 \\ e^{j\frac{1}{8}\pi} & e^{j\frac{5}{8}\pi} & e^{-j\frac{7}{8}\pi} & e^{-j\frac{3}{8}\pi} \\ e^{j\frac{1}{4}\pi} & e^{-j\frac{3}{4}\pi} & e^{j\frac{1}{4}\pi} & e^{-j\frac{3}{4}\pi} \\ e^{j\frac{3}{8}\pi} & e^{-j\frac{1}{8}\pi} & e^{-j\frac{5}{8}\pi} & e^{j\frac{7}{8}\pi} \end{bmatrix};$$

$$F_{4\times 4,3} = \begin{bmatrix} 1 & 1 & 1 & 1 \\ e^{j\frac{3}{16}\pi} & e^{j\frac{11}{16}\pi} & e^{-j\frac{13}{16}\pi} & e^{-j\frac{5}{16}\pi} \\ e^{j\frac{3}{8}\pi} & e^{-j\frac{5}{8}\pi} & e^{j\frac{3}{8}\pi} & e^{-j\frac{5}{8}\pi} \\ e^{j\frac{9}{16}\pi} & e^{j\frac{1}{16}\pi} & e^{-j\frac{7}{16}\pi} & e^{-j\frac{15}{16}\pi} \end{bmatrix};$$

$$F_{4\times 4,4} = \begin{bmatrix} 1 & 1 & 1 & 1 \\ e^{j\frac{1}{4}\pi} & e^{j\frac{3}{4}\pi} & e^{-j\frac{3}{4}\pi} & e^{-j\frac{1}{4}\pi} \\ e^{j\frac{1}{2}\pi} & e^{-j\frac{1}{2}\pi} & e^{j\frac{1}{2}\pi} & e^{-j\frac{1}{2}\pi} \\ e^{j\frac{3}{4}\pi} & e^{-j\frac{1}{4}\pi} & e^{-j\frac{3}{4}\pi} & e^{j\frac{5}{4}\pi} \end{bmatrix};$$

$$F_{4\times 4,5} = \begin{bmatrix} 1 & 1 & 1 & 1 \\ e^{j\frac{5}{16}\pi} & e^{j\frac{13}{16}\pi} & e^{-j\frac{11}{16}\pi} & e^{-j\frac{3}{16}\pi} \\ e^{j\frac{5}{8}\pi} & e^{-j\frac{3}{8}\pi} & e^{j\frac{5}{8}\pi} & e^{-j\frac{3}{8}\pi} \\ e^{j\frac{15}{16}\pi} & e^{j\frac{7}{16}\pi} & e^{-j\frac{1}{16}\pi} & e^{-j\frac{9}{16}\pi} \end{bmatrix};$$

$$F_{4\times 4,6} = \begin{bmatrix} 1 & 1 & 1 & 1 \\ e^{j\frac{3}{8}\pi} & e^{j\frac{7}{8}\pi} & e^{-j\frac{5}{8}\pi} & e^{-j\frac{1}{8}\pi} \\ e^{j\frac{3}{4}\pi} & e^{-j\frac{1}{4}\pi} & e^{j\frac{3}{4}\pi} & e^{-j\frac{1}{4}\pi} \\ e^{j\frac{9}{8}\pi} & e^{j\frac{5}{8}\pi} & e^{j\frac{1}{8}\pi} & e^{-j\frac{3}{8}\pi} \end{bmatrix};$$

$$F_{4\times 4,7} = \begin{bmatrix} 1 & 1 & 1 & 1 \\ e^{j\frac{7}{16}\pi} & e^{j\frac{15}{16}\pi} & e^{-j\frac{9}{16}\pi} & e^{-j\frac{1}{16}\pi} \\ e^{j\frac{7}{8}\pi} & e^{-j\frac{1}{8}\pi} & e^{j\frac{7}{8}\pi} & e^{-j\frac{1}{8}\pi} \\ e^{-j\frac{11}{16}\pi} & e^{j\frac{13}{16}\pi} & e^{j\frac{5}{16}\pi} & e^{-j\frac{3}{16}\pi} \end{bmatrix}.$$

Table 1 below shows an example codebook:

TABLE 3

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

Once the desired PMI for MIMO communication by the WTRU has been selected, the selected PMI is transmitted by the WTRU, step 604. If M-sub-band precoding is used, then transmitting the selected PMI includes transmitting the selected combination of M sub-bands and the selected PMI. And if separate PMIs are selected for each sub-band, then transmitting the selected PMI includes transmitting the selected sub-band PMI for each sub-band.

Although features and elements are described above in particular combinations, each feature or element may be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for selecting ranks and precoding matrix indices for multiple-input multiple-output (MIMO) communication by a wireless transmitter/receiver unit (WTRU), the method comprising:
for each rank of a plurality of ranks, determining a value of a metric indicative of a channel condition of the MIMO communication by the WTRU using that rank;
selecting at least two ranks from the plurality of ranks based on the values of the metric;
transmitting rank information indicative of the at least two selected ranks for the MIMO communication by the WTRU;
for each precoding matrix index (PMI) of a plurality of PMIs, determining a PMI value of the metric using each of the at least two selected ranks;
selecting one PMI from the plurality of PMIs based on the PMI values of the metric for each of the at least two selected ranks; and
transmitting the selected PMIs for each of the at least two selected ranks.

2. The method of claim 1, wherein determining the value of the metric for each rank of the plurality of ranks includes:
for each spatial stream used for the MIMO communication, determining a stream sub-value of the metric; and
adding the stream sub-values of the metric to determine the value of the metric.

3. The method of claim 1, wherein determining the value of the metric for each rank of the plurality of ranks includes:
for each resource block group (RBG) used for the MIMO communication, determining an RBG sub-value of the metric; and
adding the RBG sub-values of the metric to determine the value of the metric.

4. The method of claim 1, wherein the rank information is transmitted on a physical uplink shared channel (PUSCH).

5. The method of claim 4, wherein the rank information is transmitted aperiodically.

6. The method of claim 1, wherein:
the metric is a sum rate; and
selecting the at least two ranks having the two highest sum rates.

7. The method of claim 1, wherein: the metric is a sum rate; the MIMO communication uses successive interference cancellation (SIC) based on a set of codewords equal in number to a number of layers used by the WTRU for each rank;
determining the sum rate for each PMI and rank combination includes:
determining an SIC order sum rate for the PMI and rank combination for each ordering of codewords in the set of codewords by:
measuring a signal-to-interference-and-noise ratio (SINR) for each layer used by the WTRU using the SIC;
calculating a layer rate for each layer used by the WTRU from the measured SINR for the layer; and adding the layer rates to determine the SIC order sum rate; selecting the highest SIC order sum rate for the PMI and rank combination to determine the sum rate for the PMI and rank combination and the selected ordering of codewords in the set of codewords for that PMI and rank combination; and selecting at least one PMI and rank combination which includes selecting the one PMI and rank combination having the highest sum rate; and transmitting the selected ordering of codewords in the set of codewords of the one selected PMI and rank combination.

8. A method for selecting at least one rank from a plurality of ranks for multiple-input multiple-output (MIMO) communication by a wireless transmitter/receiver unit (WTRU), the method comprising:
for each rank of the plurality of ranks, determining a value of a metric indicative of a channel condition of the MIMO communication by the WTRU using that rank;
selecting the at least one rank from the plurality of ranks based on the values of the metric; and
transmitting rank information indicative of the at least one selected rank for the MIMO communication by the WTRU,
wherein:
the metric is a sum rate;
the at least one rank is one rank;
the MIMO communication uses successive interference cancellation (SIC) based on a set of codewords equal in number to a number of layers used by the WTRU for each rank;
determining the sum rate for each rank of the plurality of ranks includes:
determining an SIC order sum rate for the rank for each ordering of codewords in the set of codewords by:
measuring a signal-to-interference-and-noise ratio (SINR) for each layer used by the WTRU using the SIC;
calculating a layer rate for each layer used by the WTRU from the measured SINR for the layer; and
adding the layer rates to determine the SIC order sum rate;
selecting the highest SIC order sum rate for the rank to determine the sum rate for the rank and the selected ordering of codewords in the set of codewords for that rank;
selecting the at least one rank from the plurality of ranks includes selecting the one rank having the highest sum rate; and
transmitting the selected ordering of codewords in the set of codewords of the one selected rank.

9. A wireless transmitter/receiver unit (WTRU) configured for multiple-input multiple-output (MIMO) communication, the WTRU comprising:
a receiver to receive a signal;
a channel condition processor coupled to the receiver, for each rank of a plurality of ranks, the channel condition processor configured to determine a value of a metric indicative of a channel condition of that rank based on the received signal;

a selection processor coupled to the channel condition processor, the selection processor configured to select at least two ranks from the plurality of ranks based on the values of the metric;

a transmitter coupled to the selection processor, the transmitter configured to transmit rank information indicative of the at least two selected ranks;

for each precoding matrix index (PMI) of a plurality of PMIs, the channel condition processor configured to determine a PMI value of the metric using each of the at least two selected ranks;

the selection processor configured to select one PMI from the plurality of PMIs based on the PMI values of the metric for each of the at least two selected ranks; and the transmitter configured to transmit the selected PMIs for each of the at least two selected ranks.

* * * * *